United States Patent [19]

Ohsono et al.

[11] Patent Number: 4,795,407
[45] Date of Patent: Jan. 3, 1989

[54] STEPLESS TRANSMISSION CONTROL DEVICE

[75] Inventors: Kohei Ohsono, Saitama; Yoshihisa Iwatsuka, Sizuoka, both of Japan

[73] Assignee: Honda Giken Kogyo Kabushiki Kaisha, Tokyo, Japan

[21] Appl. No.: 75,732

[22] Filed: Jul. 20, 1987

[30] Foreign Application Priority Data

Jul. 18, 1986 [JP] Japan .................................. 61-169218

[51] Int. Cl.$^4$ ............................................. F16H 11/02
[52] U.S. Cl. ......................................... 474/28; 74/868
[58] Field of Search ..................... 474/28, 18, 11, 12, 474/17, 69, 70; 74/865, 867, 868, 869

[56] References Cited

U.S. PATENT DOCUMENTS 4,152,947  5/1979  Van Deursen et al. .......... 474/28 X
4,716,791  1/1988  Ohzono et al. .................... 474/28 X

FOREIGN PATENT DOCUMENTS 56-66553  5/1981  Japan .

Primary Examiner—Thuy M. Bui
Attorney, Agent, or Firm—Lyon & Lyon

[57] ABSTRACT

A hydraulic control system for a stepless belt and pulley transmission in which the sides of the pulleys are movable by hydraulic pressure to vary the position of the belt and thereby the transmission ratio and belt tension. The control system comprises control valves including servo mechanisms for controlling the supply of operating fluid to the pulleys during various phases of system operation.

4 Claims, 1 Drawing Sheet

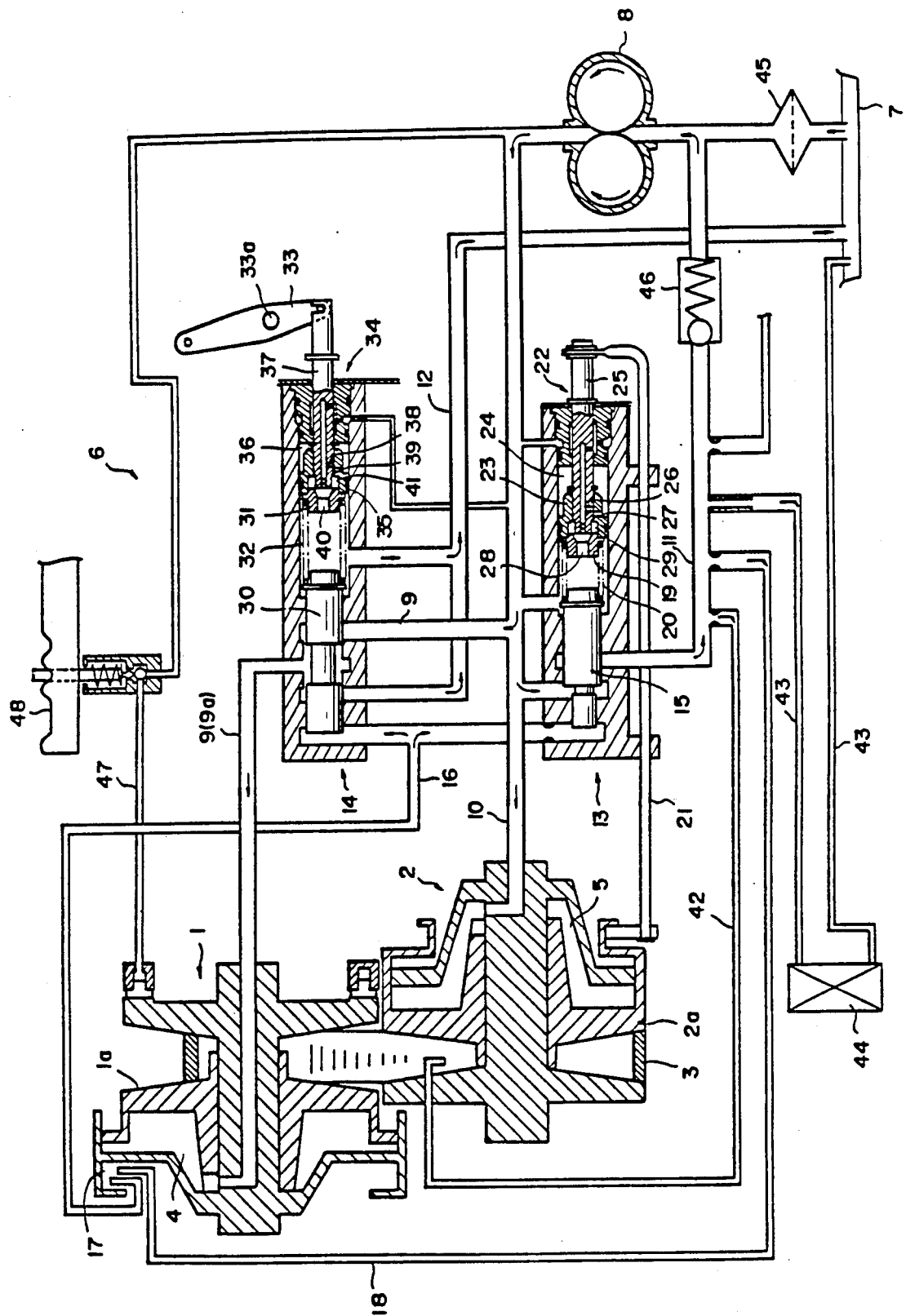

STEPLESS TRANSMISSION CONTROL DEVICE

BACKGROUND OF THE INVENTION

The present invention relates to the control of stepless transmissions for use in vehicles, or the like. More particularly, the invention relates to a control device for a stepless transmission arrangement in which an improved valve structure is employed in the hydraulic control system thereof.

U.S. Pat. No. 4,152,947, granted May 8, 1979 to van Deursen et al. discloses a stepless transmission arrangement in which an endless belt is wound between primary and secondary pulleys having movable discs and in which the transmission ratio is changed by altering the belt winding position according to the axial displacement of the respective movable discs. A hydraulic control system including hydraulic actuators for each of the movable discs is employed for controlling the disclosed transmission.

The described hydraulic control system includes a first control valve that controls the supply of hydraulic fluid to the movable disc on the secondary pulley so as to increase belt tension by movement of the disc in a way that decreases the transmission ratio. A second control valve controls the supply of hydraulic fluid to the movable disc in the primary pulley so as to decrease the transmission ratio upon an increase in primary speed and to increase the transmission ratio as primary speed is reduced.

The first control valve is an overflow valve having a movable sleeve exposed at one end to the dynamic pressure corresponding to the primary speed generated by one of the pulleys. The other end of the movable sleeve is subject to a pressing force imposed by a control spring supported by a movable spring bearing. Such movable spring bearing is connected to a detecting link that is in sliding contact with the outer periphery of the pulley and adapted to move in one direction weakening the pressing force of the control spring as the transmission ratio is reduced and in the reverse direction increasing the pressing force of the control spring as the transmission ratio is increased.

The second control valve in the described arrangement comprises a balance-type valve structure having a pilot sleeve on one end of which is imposed the dynamic pressure corresponding to the primary speed generated by the pulley and on the other end of which is imposed the pressing force of a control spring supported by a movable spring bearing. The movable spring bearing is connected to a control lever adapted to input an external signal and is adapted to move in a direction to increase the control spring pressing force upon an increase in primary speed and, conversely, in a direction weakening such pressing force upon a reduction in primary speed.

In the described stepless transmission control system the spring bearing for the control spring urging the movable sleeve of the first control valve is directly connected to the detecting link. Consequently, even when the system is in a balanced condition in which the output speed of the transmission is constant, the resilient force of the control spring continuously acts on the detecting link through the intermediary of the spring bearing. As a result of this resilient force, the detecting link and the outer periphery of the pulley are in continual contact with one another whereby, even in a balanced system, frictional forces are generated that contribute to the frictional resistance of the system.

An attempt at solving such problem is disclosed in Japanese Patent Application Publication No. 56-66553 wherein a counter spring is employed in the balanced condition to establish a counterforce in opposition to the action of the control spring on the detecting link. This measure is, however, not totally dispositive of the problem.

Another problem in the described prior art stepless transmission arrangement results from the fact that the spring bearing for the control spring urging the movable sleeve of the second control valve is adapted to be driven by a bellows operating in a pressure detecting portion of the system to introduce a negative throttle pressure as an external input. As a result of this, the stroke control of the pilot valve becomes indirect requiring a complicated structure for the actuator for inputting a speed signal. While the device described in the aforementioned Japanese Patent Application Publication No. 56-66553 adopts a direct control system and is, accordingly, simple in its structure, because the resilient force of the control spring acts on a rod for inputting the speed signal, a large operating force is required to produce this action whereby control performance is reduced.

It is to the amelioration of these problems, therefore, that the present invention is directed.

SUMMARY OF THE INVENTION

Therefore, one aspect of the present invention is characterized in that in a stepless transmission arrangement of the described type the spring bearing of the first control valve is driven by a hydraulic servo mechanism provided with a control piston abutting the movable spring bearing on the side opposite the control spring. This servo mechanism contains a hydraulic chamber formed to exert hydraulic actuation to the control piston from the opposite side of the movable spring bearing and a control rod slidably inserted into the control piston and connected to the detecting link. The hydraulic chamber is capable of communicating with the feed side of the hydraulic circuit through the intermediary of ports in the control rod and the control piston, which ports are capable of communicating with the return side of the hydraulic circuit through the intermediary of ports in the movable spring bearing and the control piston, the position of control rod ports being operative to switch according to a transmission ratio signal.

A second aspect of the invention is characterized in that in a stepless transmission arrangement of the described type the movable spring bearing of the second control valve is driven by a hydraulic servo mechanism provided with a control piston abutting the movable spring bearing from the side opposite the control spring. The servo mechanism contains a hydraulic chamber formed to exert hydraulic actuation to the control piston from the opposite side of the movable spring bearing and a control rod slidably inserted into the control piston and connected to the control lever is used as a control device for external signal input. The hydraulic chamber is capable of communicating with the feed side of the hydraulic circuit through the intermediary of ports in the control rod and in the control piston and is capable of communicating with the return side of the hydraulic circuit through the intermediary of ports in the movable spring bearing and in the control piston, the position of the ports in the control rod being intended to switch according to an external signal.

According to the first aspect of the invention, when the control rod of the first control valve moves by means of the detecting link in the direction decreasing the transmission ratio, the hydraulic chamber communicates with the return side of the hydraulic circuit and the oil pressure in the hydraulic chamber is reduced thereby to decrease the sleeve-pressing force of the control spring through the intermediary of the spring bearing. Also, when the control rod moves by means of the detecting link in the direction increasing the transmission ratio, the hydraulic chamber communicates with the feed side of the hydraulic circuit and the oil pressure is augmented thereby to increase the sleeve-pressing force of the control spring through the intermediary of the spring bearing. Because the control rod is slidable in the first control valve and is used only to perform the port switching function, the control rod is not subject to the resilient force of the control spring. Accordingly, since the resilient force of the control spring also does not act on the detecting link connected to the control rod, a large friction force does not occur in the sliding contact between the detecting link and the outer periphery of the pulley.

According to the second aspect of the invention, when the control rod of the second control valve moves under the influence of the control lever in the direction corresponding to a reduction in primary speed, the hydraulic chamber communicates with the feed side of the hydraulic circuit and the oil pressure in the hydraulic chamber is agumented whereby the spring bearing retracts and the sleeve-pressing force of the control spring decreases. Also, when the control rod moves under the influence of the control lever in the direction corresponding to an increase in primary speed, the hydraulic chamber communicates with the feed side of the hydraulic circuit and the oil pressure in the hydraulic chamber is increased whereby the spring bearing advances and the sleeve-pressing force of the control spring increases. Because the control rod of the second control valve also is slidable in the second control valve and is used only to perform the port switching function, the control rod is not subject to the resilient force of the control spring. Accordingly, the hydraulic transmission function is adapted to be performed without resistance, smoothly and sharply by the control lever for inputting the primary speed signal to the control rod.

In view of the above, it is one object of the present invention to provide a stepless transmission control device which reduces friction between a detecting link and the outer periphery of the pulley for inputting the transmission ratio in the first control valve thus to reduce the rotating friction losses and thereby improve operating performance of the system.

Another object of the present invention is to provide a stepless transmission control which permits the degree of freedom of an actuator to be improved by adopting as a direct mechanical system a control rod for inputting an external signal, whereby the resilient force of the control spring does not act on the control rod, thus to improve the control performance of the system.

For a better understanding of the invention, its operating advantages, and the specific objects obtained by its use, reference should be made to the accompanying drawing and description which relate to a preferred embodiment of the invention.

BRIEF DESCRIPTION OF THE DRAWING

The single drawing figure is a schematic representation of a stepless transmission arrangement and control therefor according to the present invention.

DESCRIPTION OF THE PREFERRED EMBODIMENT

With reference to the drawing a general description of the entire organization is first made.

The illustrated stepless transmission incudes an endless belt 3 wound between a primary pulley 1 and a secondary pulley 2, each having movable discs 1a, 2a as one wing thereof to successively change the transmission ratio by changing the belt position according to the axial displacement of the respective movable discs 1a, 2a. The movable discs 1a, 2a are driven by the supply of oil pressure from a hydraulic circuit 6 to a primary cylinder 4 and a secondary cylinder 5 formed on the outside surface of each of the movable discs.

The hydraulic circuit 6 includes a tank 7, a pump 8, a feed pipe 9 to the primary cylinder 4, a feed pipe 10 to the secondary cylinder 5, and return pipes 11, 12, or the like. The piping portion of the hydraulic circuit 6 includes a first control valve 13 and a second control valve 14. The first control valve 13 controls the oil pressure to the secondary cylinder 5 in order to control belt tension. The second control valve 14 regulates the oil pressure to the primary cylinder 4 and controls the transmission ratio of the system. Specifically, the first control valve 13 operates to weaken belt tension upon a shift to the side reducing the transmission ratio (high gear) and increases belt tension upon a shift to the side increasing the transmission ratio (low gear) whereby the control is effective to improve driving performance. The second control valve 14 is similarly controlled to reduce the transmission ratio upon increasing the primary speed and to increase the transmission ratio upon reducing the primary speed.

The first control valve 13 is an overflow valve having a movable sleeve 15 adapted to control fluid supply between the feed pipe 9 and the primary cylinder 4 and between the return pipe 11 and the pump 8. One end of the movable sleeve 15 is acted on in accordance with the speed of the primary pulley 1 by means of a dynamic pressure pipe 16 that communicates with a dynamic pressure chamber 17 formed on the outer peripheral side of the primary pulley 1 to which oil is supplied from the return pipe 11 by means of feed pipe 18.

The pressing force of a control spring 20 supported by a movable spring bearing 19 is adapted to act on the other end of the movable sleeve 15. The spring bearing 19 is operated by a hydraulic servo mechanism 22 whose outer end is connected by means of a detecting link 21 to the outer periphery of the movable disc 2a of the secondary pulley 2. Accordingly, when the transmission ratio is decreased, i.e., when the movable disc 2a moves to the right as shown in the drawing figure, the spring bearing 19 is caused to be drawn to the right thereby weakening the pressing force of the control spring 20. Conversely, when the transmission ratio is increased, i.e., when the movable disc 2a moves to the left in the drawing figure, the spring bearing 19 is urged to the left by the link 21 to augment the pressing force of the control spring 20. The actuation of the spring bearing 19 is otherwise designed to be effected by means of the hydraulic servo mechanism 22.

The hydraulic servo mechanism 22 has a control piston 23 which abuts the spring bearing 19 on the side thereof opposite the control spring 20. The control piston 23 moves in a hydraulic chamber 24 formed to permit oil pressure to act on the side of the piston opposite the spring bearing 19. A control rod 25 is provided having one end slidably inserted into the control piston 23 and its other end connected to the detecting link 21. The hydraulic chamber 24 communicates with the feed pipe 9 of the hydraulic circuit 6 by means of port 26 in the control rod 25 and port 27 in the control piston 23. Also, the hydraulic chamber 24 is capable of communicating with the return pipe 11 through the cooperation of the port 27 in the control piston 23, an opening in the spring bearing 19, and a gap 29 between the leading end of the control rod 25 and the spring bearing 19. The flow of oil through the ports 26, 27 and 28 is selectively effected by displacement of the control rod 25 or of the spring bearing 19 with oil flow through the ports being interrupted when the movable sleeve 15 is stopped in a balanced condition.

The second control valve 14 is a balance type valve which is adapted to open and close the feed pipe 9 to the cylinder 4 of the primary pulley 1 and the return pipe 12 to the tank 7. The second control valve 14 has a pilot sleeve 30, on one end of which the dynamic pressure generated in accordance with the speed of the primary pulley 1 is imposed by means of the dynamic pressure pipe 16 that communicates with the dynamic pressure chamber 17. The other end of the pilot sleeve 30 receives the pressing force of the control spring 32 which is supported by the movable spring bearing 31. The spring bearing 31 is connected by means of hydraulic servo mechanism 34 to a control lever 33 which operatively connects with an accelerator device used as a control device for inputting an external signal. The hydraulic servo mechanism 34 has a control piston 35 which abuts the spring bearing 31 on the end opposite that which mounts the control spring 32. A hydraulic chamber 36 is provided in the servo mechanism 34 to allow oil pressure to act on the control piston 35 from the opposite side of the spring bearing 31. A control rod 37 is slidably inserted into the control piston 35 and connected to the control lever 33.

The hydraulic chamber 36 is capable of communicating with the feed pipe 9 of the hydraulic circuit 6 by means of a port 38 in the control rod 37 and a port 39 in the control piston 35. Also, the hydraulic chamber 36 is capable of communicating with the return pipe 12 through the port 39 in the control piston 35, a port 40 in the spring bearing 31, and a gap 41 in the leading end of the control rod 37. The switching of each of the ports 38 to 40 is selectively effected by displacement of the control rod 37 or the spring bearing 31, and the flow of oil through these ports is interrupted when the pilot sleeve is stopped in a balanced condition.

The function of the above arrangement is described with reference to the drawing which illustrates a condition in which the transmission system is set in low gear and the transmission ratio is large. In this condition, if the primary speed is constant, the oil feed to the cylinder 4 of the primary pulley 1 is interrupted by the first control valve 13. The oil pressure from the pump 8 circulates via the feed pipe 9 and the return pipe 11 in accordance with the overflow action of the first control valve 13. When the primary speed increases, the dynamic pressure in the chamber 17 increases and acts on the pilot sleeve 30 of the second control valve 14 via the dynamic pressure pipe 16, whereupon the pilot sleeve 30 is caused to move toward the right end of the mechanism as illustrated. The oil pressure is thus supplied to the primary cylinder 4 via the feed pipe 9 whereby the distance between the wings of the primary pulley 1 is reduced and the endless belt 3 moves toward the large diameter side of the pulley 1. Accordingly, a shift to the side decreasing the transmission ratio is effected. Simultaneously therewith, the control lever 33 pivots about a fulcrum 33a in a clockwise direction according to the external signal. Thus, in the hydraulic servo mechanism 34 of the second control valve 14, the port 3 of the control rod 37 is caused to communicate with the port 39 of the control piston 35 so that the oil pressure in the feed pipe 9 acts on the hydraulic chamber 36, and the spring bearing 31 moves left thereby compressing the control spring 32. This action continues until the dynamic pressure and the spring pressure are balanced.

With increasing primary speed, the endless belt 3 moves to the small diameter side of the secondary pulley 2 causing the movable disc 2a to move to the right. In this condition, since the detecting link 21 and the control rod 35 also move to the right, the port 27 of the control piston 23 communicates with the gap 29 in the first control valve 13, whereby the oil pressure in the hydraulic chamber 24 is exhausted to the return pipe 12 through the port 28 of the spring bearing 19. Accordingly, since the control piston 23 and, therefore, the spring bearing 19 move to the right and the pressure applied by the control spring 20 is reduced, the opening areas of the feed pipe 10 and of the return pipe 11 are expanded by the movable sleeve 15. That is to say, the amount of the oil passing between pipes 10 and 11 becomes great and the pressure in the second cylinder 5 is reduced. As result of this, the belt tension decreases when shifting to the side reducing the transmission ratio. This action continues until a balance is achieved between the overflow pressure, the dynamic pressure of the pulley and the pressure of the control spring 32.

Conversely, when the primary speed is lowered, the dynamic pressure in chamber 17 decreases to act on the pilot sleeve 30 of the second control valve 14 through the dynamic pressure pipe 16. Thereupon, the pilot sleeve 30 is caused to move toward the left and oil flow from the feed pipe 9 is interrupted. When this occurs, the feed pipe 9 (9a) on the pulley side of the servo mechanism communicates with the return pipe 12 whereby the oil pressure decreases in the primary cylinder 4 and the endless belt 3 is moved toward the small diameter side of the pulley, that is, shifted to the low gear side to increase the transmission ratio. At this time the control lever 33 pivots about the fulcrum 33a in a counterclockwise direction and, in the servo mechanism in the second control valve 14, the port 39 of the control piston 35 communicates with the gap 41 and the oil pressure in the hydraulic chamber 36 is exhausted to the return pipe 12. Accordingly, the spring bearing 31 moves toward the right and the resilient force of the control spring 32 falls. This action continues until a balance is achieved between the reduced spring force and the decreased dynamic pressure.

Under this condition, the endless belt 3 moves toward the large diameter side of the secondary pulley 2 and the movable disc 2a moves toward the left. However, since the detecting link 21 and the control rod 25 also moves to the left, the port 27 of the control piston 23 communicates with the port 26 of the control rod 25 in the first control valve 13 and oil pressure is supplied from the feed pipe 10 in the hydraulic chamber 24. Accordingly, since the control piston 23 and, therefore, the spring bearing 19 move to the left to compress the control spring 20, the movable sleeve 15 also moves to the left, thereby to reduce the overflow from the feed pipe 10 to the return pipe 11. Thus, the pressure in the secondary cylinder 5 is increased. As a result of this, the belt tension increases on shifting to the side increasing the transmission ratio. This action is effected until a balance is achieved between the overflow pressure, the dynamic pressure of the pulley and the pressure of the control spring 32.

As mentioned above, according to the invention, the first and the second control, valves, 13 and 14, are provided with servo mechanisms 22 and 34, respectively, adapted to freely actuate the control rods 25, 37 connecting with spring bearings 19 and 31. Accordingly, the arrangement permits, when a balanced condition occurs, the sliding resistance developed between the detecting link 21 for transmitting the transmission ratio to the first control valve 13 and the outer periphery of the secondary pulley 2 to be reduced. The arrangement further improves the operating performance of the control lever 33 for inputting the external signal to the second control valve 14 by expanding the degree of freedom of actuation for inputting the external signal.

From the above it will be appreciated that the present invention provides an improvement over prior art control devices for stepless transmission systems of the described type in that friction forces occurring between the pulley surface and the detecting link are reduced thereby to reduce friction losses in the system. The invention also provides an improved arrangement for inputting the external signal to the control device whereby the operating performance of the transmission system is enhanced.

Although servo mechanisms 23, 34 are provided in the described arrangement on both the first and the second control valves 13, 14, the present invention, of course, can be realized in a form wherein a servo mechanism is provided for only one of the control valves.

In the drawing figure, there are also depicted a pipe 42 for lubricating the belt, a return pipe 43 for filtering, a filter 44 provided in the pipe 43, a filter at 45 provided in an upstream side of the pump 8, a check valve at 46, a hydraulic brake system at 47 and an actuator at 48.

It will be understood that various other changes in the details, materials and arrangements of parts which have been described and illustrated herein in order to explain the nature of the invention may be made by those skilled in the art within the principle and scope of the invention as expressed in the appended claims.

We claim:

1. A stepless transmission system for use with an engine comprising:
   first and second pulleys, each including a pair of laterally spaced, oppositely facing, rotatable discs; and endless belt drivingly connecting said pulleys and disposed in the space between said discs;
   hydraulically operated means for varying the spacing between said discs for changing the position of said belt on said pulleys and, thereby, the transmission ratio of said system;
   a hydraulic control circuit for controlling the lateral spacing between said discs including a control valve operatively connecting the movable disc on each of said pulleys, said control valves each having a movable sleeve for controlling the flow of operating fluid therethrough;
   means for imposing a fluid pressure on one end of each of said sleeves corresponding to the primary speed of said system;
   a spring including a movable spring holder for biasing the other end of each of said sleeves in opposition to said fluid pressure; and
   servo mechanism means for moving each of said spring holders in response to a system operating condition, each said servo mechanism means including a piston engaging said spring holder and a control rod slidably received in said piston, and means forming ports through said spring holder, said controlpiston and said control rod for controlling the passage of operating fluid therethrough in response to said system operating condition.

2. The stepless transmission system according to claim 1 including a pulley disc position-detecting link having one end slidably engaging the movable disc of one of said pulleys and the other end thereof connecting the servo mechanism control rod of one of said control valves.

3. The stepless transmission system according to claim 1 including a control eever operative to input an external signal representative of the position of the acceleration of said engine, said control lever connecting the servo mechanism control rod of one of said control valves.

4. The stepless transmission system according to claim 2 including a control lever operative to input an external signal representative of the position of the accelerator of said engine, said control lever connecting the servo mechanism control rod of the other of said control valves.

* * * * *

UNITED STATES PATENT AND TRADEMARK OFFICE
CERTIFICATE OF CORRECTION

PATENT NO. : 4,795,407
DATED : January 3, 1989
INVENTOR(S) : KOHEI OHSONO et al.

It is certified that error appears in the above-identified patent and that said Letters Patent is hereby corrected as shown below:

In column 8, line 32, delete "controlpiston" and insert therefor -- control piston --.

In column 8, line 42, delete "eever" and insert therefor -- lever --.

Signed and Sealed this

Second Day of January, 1990

Attest:

JEFFREY M. SAMUELS

Attesting Officer    Acting Commissioner of Patents and Trademarks